United States Patent [19]
Harkness

[11] 3,841,425
[45] Oct. 15, 1974

[54] CONTROLLED VIBRATION ABSORBING MOUNTING FOR ENGINES

[75] Inventor: Joseph R. Harkness, Germantown, Wis.

[73] Assignee: Briggs & Stratton Corporation, Wauwatosa, Wis.

[22] Filed: Oct. 26, 1973

[21] Appl. No.: 410,188

[52] U.S. Cl................. 180/53 R, 248/9, 180/64 R
[51] Int. Cl............................................ E02d 27/44
[58] Field of Search............. 180/64 R, 53 R, 19 R; 248/3, 6, 7, 8, 9, 21, 22

[56] References Cited
UNITED STATES PATENTS

| | | | |
|---|---|---|---|
| 1,815,170 | 7/1931 | Summers | 248/21 |
| 1,976,701 | 10/1934 | Trott | 248/7 |
| 2,055,279 | 9/1936 | D'Aubarede | 248/7 |
| 3,236,326 | 2/1966 | Reynolds | 180/64 R |
| 3,402,782 | 9/1968 | Ljungstrom | 180/64 R |
| 3,429,533 | 2/1969 | Harkness | 248/9 |

Primary Examiner—Kenneth H. Betts
Assistant Examiner—Jack D. Ruberstein

[57] ABSTRACT

A riding power lawn mower powered by a vertical shaft single cylinder engine that is mounted on the frame of the implement by conventional soft mounts and is connected with the implement frame by resiliently flexible metal strips that have edgewise stiffness and flatwise flexibility to restrain the engine from lateral displacement while leaving it free to move vertically to the extent the soft mounts provide such freedom.

7 Claims, 6 Drawing Figures

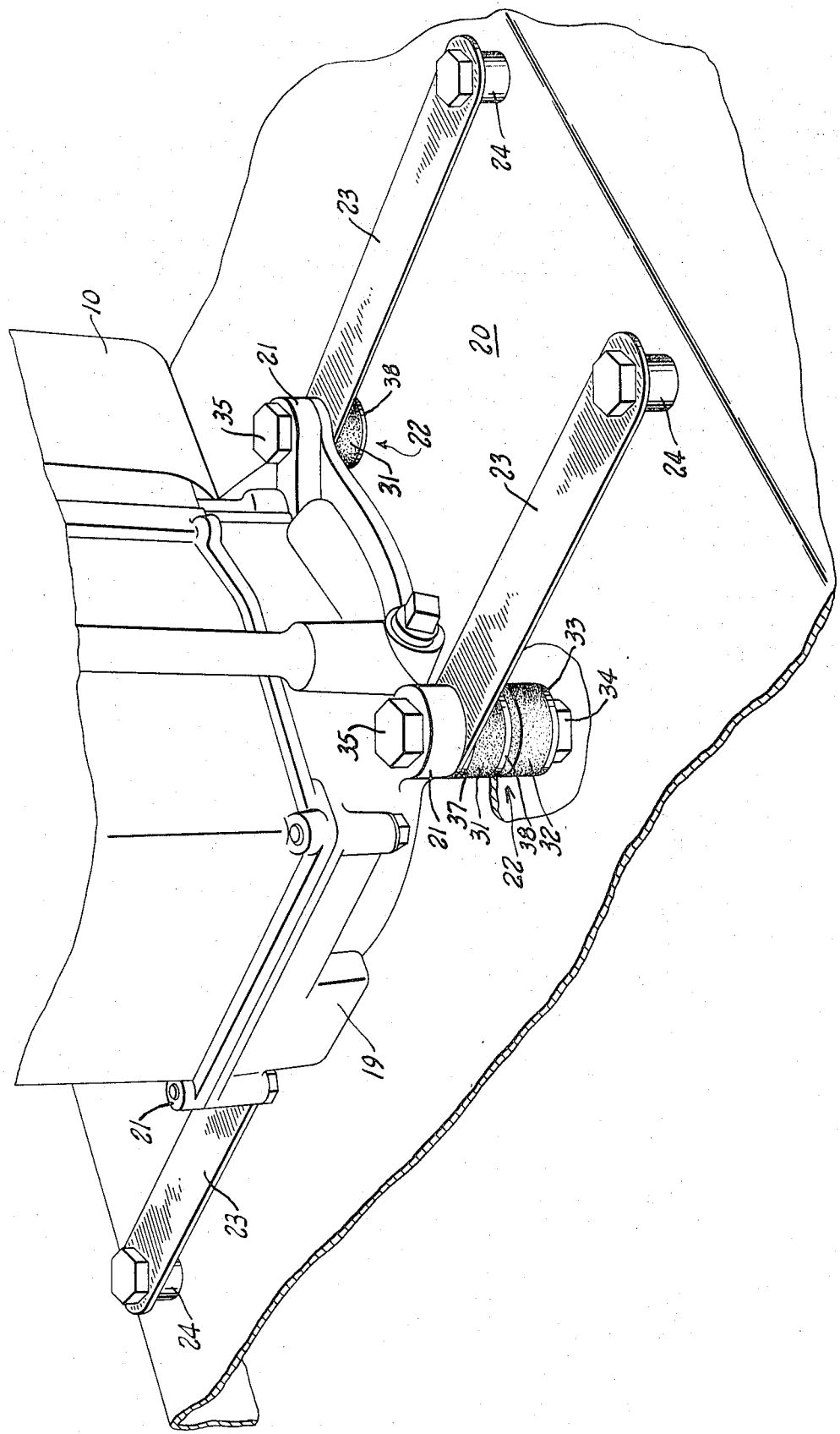

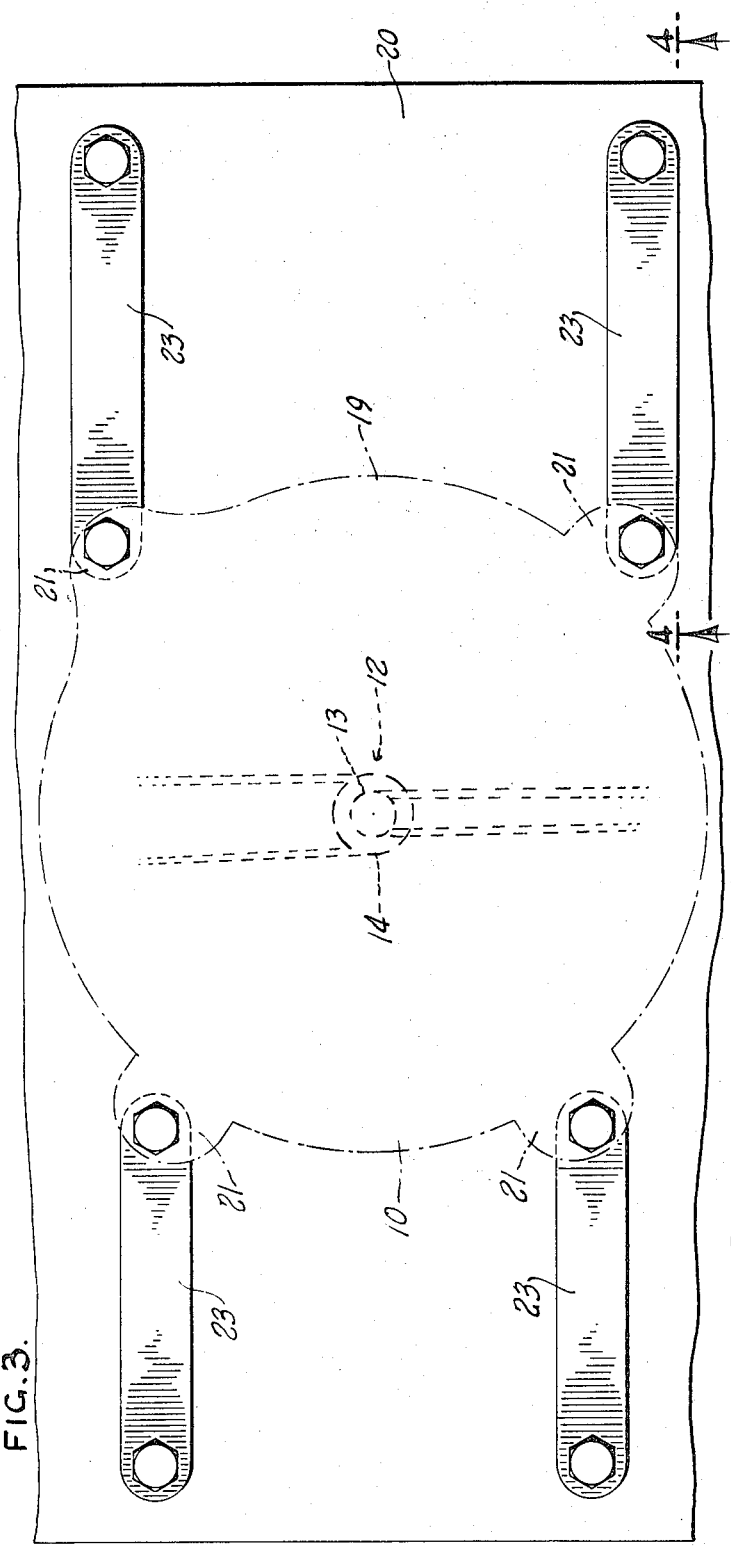
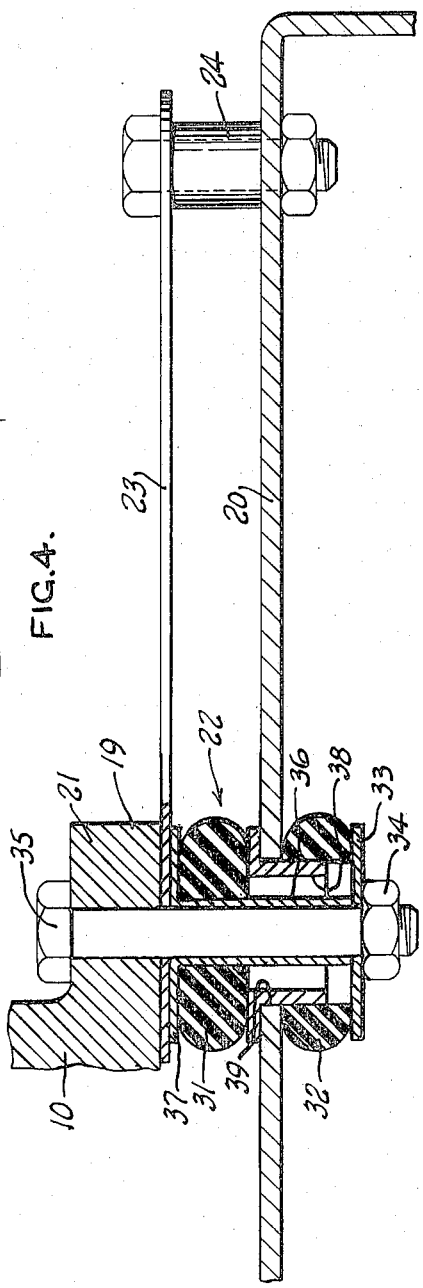
FIG.3.
FIG.4.

CONTROLLED VIBRATION ABSORBING MOUNTING FOR ENGINES

This invention has as its purpose the reduction in the amount of vibration which a single cylinder vertical shaft engine in operation can transmit to a machine or implement on which it is mounted and for which it provides power.

Power lawn mowers, particularly the riding type, and garden tractors are typical examples of machines in which engine-produced vibration is an especially acute problem. Not only is the transmission of vibration from the engine to the machine objectionable because it causes operator fatigue and discomfort-especially in the case of riding mowers and tractors-but also because of the noise which vibration of any kind produces.

Obviously, of course, much of the vibration problem can be eliminated at its source by building vibration eliminating balancing into the engine, as in the Harkness U.S. Pat. No. 3,457,804, but the cost of engines thus equipped is a serious deterrent to widespread use. Manufacturers of engine-powered implements have therefore gravitated to the use of soft mounts. Soft mounts are simple cushioned supports upon which the engine sets and generally consist of rubber pads or blocks that isolate the engine and the mounting bolts from the implement frame. There are many forms of such soft mounts, all of which — to some extent — approach, at least in concept, the simple expedient of having the engine sitting on a sponge rubber pad. In such a situation, even relatively large vibration-produced motion of the engine in any direction could take place without transmitting any vibration to whatever is supporting the pad.

While practical considerations make it impossible for soft mounts to absorb vibration to the extent accomplished by setting the engine on a sponge rubber pad, there are many installations where appropriately designed and proportioned soft mounts is all that is needed.

However, in situations where engine power must be transmitted to parts of the machine powered by the engine — as, for instance, the transmission gearing of a riding mower or garden tractor, or to the rotary cutter blade or blades of the mower — the use of soft mounts alone is not the answer to the vibration problem. This is so because soft mounts permit vibratory motion of the engine in all directions with respect to the implement on which it is mounted and for which it provides power. As a result, the location of the power take-off at the bottom end of the vertically oriented crankshaft shifts objectionably. The Harkness U.S. Pat. No. 3,429,533 discusses this problem in considerable detail; and while the invention of that patent did provide a solution to the problem, the manner in which it did so was not adaptable to many situations where a good vibration absorbing engine mounting is sorely needed.

It is therefore an object of this invention to provide a vibration absorbing engine mounting that can be used in any situation where conventional soft mounts are usable.

Since conventional soft mounts permit the engine to move in all directions with respect to the machine on which it is mounted, and since it is essentially the mounting of vertical shaft engines with which the invention is concerned, a specific object of the invention is to restrict or confine the vibration that soft mounts permit, to movement in the vertical direction so that the consequent changes in location of the power take-off will have little or no effect upon the driving connection between the engine and the mechanism that it drives.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof and in which:

FIG. 2 is a perspective view of a portion of the engine and one embodiment of the vibration absorbing mounting of this invention;

FIG. 3 is a top plan view of that portion of the machine or implement upon which the engine is mounted, illustrating the engine mounting shown in FIG. 2, with the engine diagrammatically depicted in broken light lines;

FIG. 4 is a cross sectional view through FIG. 3 on the plane of the line 4—4;

Figure 1:
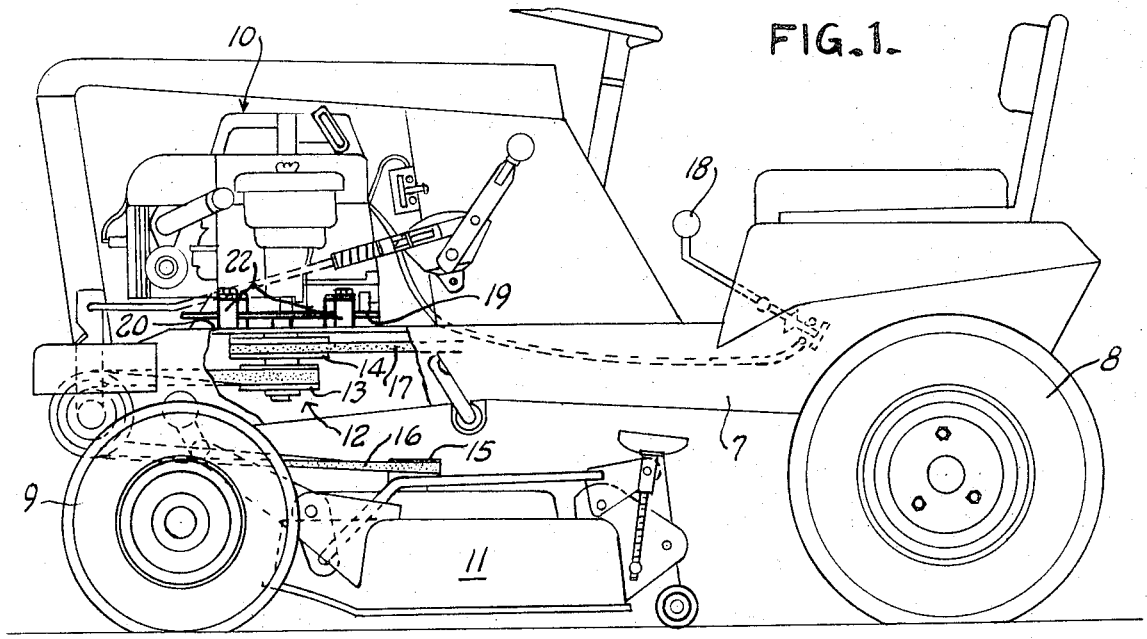
FIG. 1 is a side view of a riding type power lawn mower, the engine of which is mounted in accordance with this invention.
Figure 5:
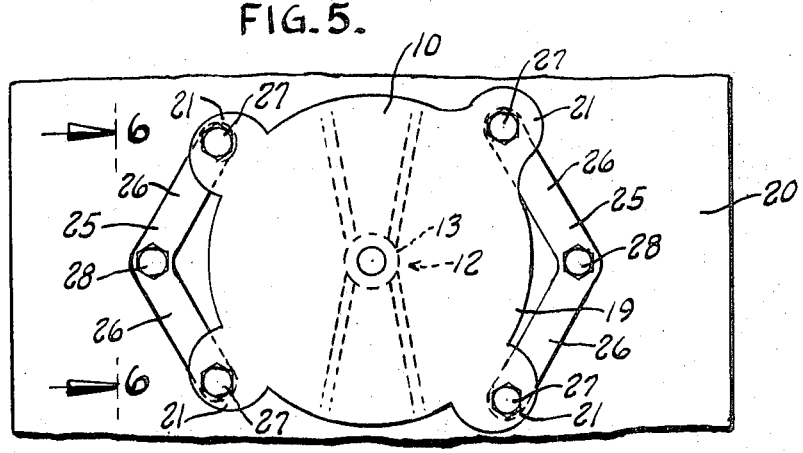
FIG. 5 is a top view similar to FIG. 2, but illustrating a modified embodiment of this invention.
Figure 6:
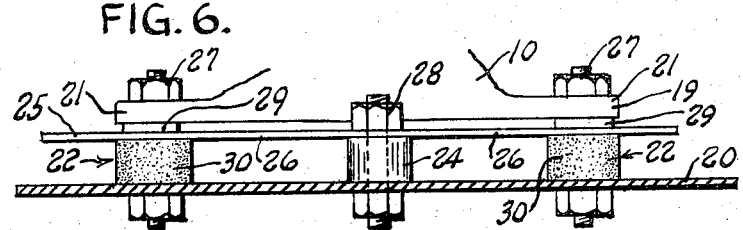
FIG. 6 is a sectional view through FIG. 5 on the plane of the line 6—6.

Referring now to the accompanying drawings, the riding type power lawn mower illustrated in FIG. 1 as an example of the kind of engine powered machines or implements with which this invention is concerned, has a main frame designated by the numeral 7 that is supported on rear traction wheels 8 and steerable front wheels 9. A vertical shaft internal combustion engine 10 provides power to drive the traction wheels and also the blade or blades (not shown) of a mower 11 that is suspended beneath the main frame and connected therewith to be carried along with the machine.

Engine power to drive the mower blade or blades and the traction wheels is derived from a power take-off 12 in the form of a pair of drive pulleys 13 and 14 fixed to the bottom end of the engine crankshaft. These pulleys are respectively connected with a driven pulley 15 on the mower through a belt 16 and through a belt 17 with transmission mechanism (not shown) by which power is applied to the rear wheels 8 under control of a gear shift lever 18.

The engine, being of the vertical shaft type, has its crankshaft projecting downwardly beyond the base 19 of the engine, so that the power take-off 12 is located below the frame 7 upon which the engine is mounted. Regardless of the specific design or type of the machine or implement, that part of its frame upon which the engine is mounted is a sturdy horizontally oriented portion 20 which is at least as large in area or extent as the bottom of the engine base, and ordinarily it is substantially larger, as depicted in FIG. 3.

Since the engine is of the conventional vertical shaft variety, its base 19 has four coplanar circumferentially spaced mounting spots 21 with bolt holes therethrough. Where there is no need to consider the consequences of engine vibration, these mounting spots or feet, as they might be considered, simply set upon the engine support and are secured thereto by bolts that pass through the bolt holes.

Heretofore, where attempts have been made to isolate engine vibration from the machine or implement on which the engine was mounted, soft mounts 22 of one form or another were employed to provide a cushioned support for the engine, but — as explained hereinbefore — soft mounts do not preclude lateral or rocking motion of the engine with respect to the frame of the machine on which it is mounted. When that occurs, the location of the power take-off at the bottom of the engine crankshaft is anything but stationary, making it well nigh impossible to efficiently transmit engine power to the parts of the machine to be driven.

This invention cures that problem by preventing lateral displacement of the engine while leaving it free to move in the vertical direction, since limited vertical displacement of the power take-off seldom has an objectionable effect upon power transmission. The invention accomplishes this result by connecting the mounting spots 21 on the engine base with the machine or implement frame by resiliently flexible metal strips 23.

In the embodiment of the invention depicted in FIGS. 2–4, the strips 23 are straight flat members of uniform width and thickness. One end of each strip is rigidly secured to its respective mounting spot 21 by clamping the same between the underside of the engine base and the top of the adjacent soft mount 22, as depicted in FIG. 4. The other end of each strip 23 is rigidly secured to the implement frame by being bolted thereto with a spacer 24 therebetween. Preferably the spacer 24 is of the same height as the soft mount, so that the strip 23 is uniformly spaced from the frame.

For the strips 23 to accomplish their purpose, they must have edgewise stiffness and flatwise flexibility which requirement is satisfied by having the width of the strips considerably greater than the thickness, and of course they must have their flat surfaces horizontal.

When the implement frame is wide enough, the strips 23 can be parallel with one another as shown in FIG. 3; for narrower implements, the two strips at each side of the engine can be combined in a single unit 25, having angularly disposed arms 26. The outer ends of the arms 26 are rigidly secured, as at 27, to the mounting spots or feet of the engine base, and the mid-point of each unit — where the arms 26 meet — is rigidly fixed to the implement frame, as at 28. To permit flatwise flexure of the arms 26 (each of which can be considered a separate resiliently flexible strip) they are spaced from the underside of the engine by washers or spacers 29, as well as from the frame portion on which the engine is mounted, the latter spacing being provided by solid collars 30.

Although the soft mounts 22 can be of any suitable design, the type illustrated in FIG. 4 has been found to be entirely feasible. It consists of two rubber collars 31 and 32, the former confined between the top of the frame portion — upon which the engine is mounted — and the underside of the mounting spot or foot 21 of the engine base, and the latter between the underside of the frame portion and a washer 33, under a degree of compression established by the securement of a nut 34 to a bolt 35 which passes through the assembly. A tubular ferrule 36 with a flange 37 at its upper end, encircles the bolt and limits the extent the rubber collars are compressed, by being clamped between the washer 33 and the underside of the portion of the adjacent strip 23 which, in turn, bears against the bottom of the engine. A second shorter flanged ferrule 38 fits in the hole 39 in the frame through which the bolt 35 passes and extends down into the hole in the lower rubber collar 32 to keep the bolt 35 from contacting any part of the frame.

Those skilled in the art will appreciate that the invention can be embodied in forms other than as herein disclosed for purposes of illustration.

The invention is defined by the following claims:

I claim:

1. In combination with an implement such as a power lawn mower, garden tractor or the like having a frame with a generally horizontal portion, and a vertical shaft engine which provides power for the implement, the engine having a base with spaced apart mounting spots on its bottom, and having its crankshaft projecting downwardly with power take-off means thereon, vibration absorbing means mounting the engine on said generally horizontal portion of the frame of the implement, comprising:

A. a soft mount connecting each of the spaced apart mounting spots of the engine base with said generally horizontal portion of the implement;
   B. a plurality of resiliently flexible strips each rigidly connected at one end to the engine base and projecting therefrom in spaced substantially parallel relationship to said generally horizontal portion of the implement frame; and
   C. means rigidly anchoring each of said resiliently flexible strips at a distance from its connection with the engine, to said implement frame,
   said resiliently flexible strips being elongated and substantially flat and having greater width than thickness so that they have edgewise stiffness and flatwise flexibility, and said strips having their major surfaces facing upward and downward so that said strips restrain lateral displacement of the engine with respect to the implement frame but leave the engine free to move vertically to the extent the soft mounts provide for such movement,
   whereby the location of the power take-off means with respect to the implement is not objectionably altered by the permitted movement of the engine.

2. The invention defined by claim 1, further characterized in that said resiliently flexible strips are spaced above said generally horizontal portion of the implement frame.

3. The invention defined by claim 1, wherein the anchorage of each of said resiliently flexible strips comprises:

1 a rigid spacer between the strip and the adjacent part of said implement frame; and
   2 fastening means passing through said spacer and clamping the same between the resiliently flexible strip and said part of the implement frame.

4. The invention defined by claim 1, wherein there is one resiliently flexible strip for each of the spaced apart mounting spots of the engine base;

and wherein the connections of said strips to the engine are located at said mounting spots.

5. The invention defined by claim 4, wherein there are four mounting spots on the engine base, and wherein said resiliently flexible strips extend from the engine towards the opposite sides of said generally horizontal portion of the frame and are generally parallel with one another.

6. The invention defined by claim 1, wherein there are four mounting spots on the engine base, wherein the resiliently flexible strips that are connected to two adjacent mounting spots are oppositely projecting arms of a unitary member, and wherein each of said unitary members is anchored to the implement frame at a single point between the two adjacent mounting spots to which its arms are secured.

7. The invention defined by claim 1, wherein said resiliently flexible strips are of metal.

* * * * *